(12) United States Patent
Sallen Rosello

(10) Patent No.: US 8,246,866 B2
(45) Date of Patent: Aug. 21, 2012

(54) COMPOSITION PROTECTIVE AGAINST FIRE AND USE

(75) Inventor: César Sallen Rosello, Binefar (ES)

(73) Assignee: Ingenieria Y Control Del Fuego, S.L., Binefar (Huesca) (ES)

( * ) Notice: Subject to any disclaimer, the term of this patent is extended or adjusted under 35 U.S.C. 154(b) by 0 days.

(21) Appl. No.: 13/006,887

(22) Filed: Jan. 14, 2011

(65) Prior Publication Data

US 2011/0163252 A1    Jul. 7, 2011

Related U.S. Application Data

(63) Continuation of application No. PCT/ES2009/070245, filed on Jun. 24, 2009.

(30) Foreign Application Priority Data

Jul. 14, 2008 (ES) .................................. 200802086

(51) Int. Cl.
| | |
|---|---|
| C09K 21/00 | (2006.01) |
| C09K 21/02 | (2006.01) |
| C09K 21/06 | (2006.01) |
| A62D 1/00 | (2006.01) |

(52) U.S. Cl. ............. 252/603; 252/2; 252/601; 252/607
(58) Field of Classification Search .............. 252/2, 601, 252/603, 607
See application file for complete search history.

(56) References Cited

U.S. PATENT DOCUMENTS

| | | | |
|---|---|---|---|
| 3,243,312 A * | 3/1966 | Schutzner et al. ............ 503/210 |
| 5,685,903 A | 11/1997 | Stav et al. | |
| 5,718,759 A | 2/1998 | Stav et al. | |
| 5,858,083 A | 1/1999 | Stav et al. | |
| 5,968,669 A | 10/1999 | Liu et al. | |
| 6,084,008 A | 7/2000 | Liu | |
| 2002/0013403 A1 | 1/2002 | Vandersall | |
| 2002/0189492 A1 | 12/2002 | Vandersall et al. | |
| 2003/0034311 A1 | 2/2003 | Miller | |
| 2004/0110870 A1 | 6/2004 | Liu | |

FOREIGN PATENT DOCUMENTS

| | | |
|---|---|---|
| WO | 95/33698 | 12/1995 |
| WO | 99/67344 | 12/1999 |

OTHER PUBLICATIONS

International Search Report issued Sep. 8, 2009 in International (PCT) Application No. PCT/ES2009/070245.

* cited by examiner

Primary Examiner — Peter F Godenschwager
(74) Attorney, Agent, or Firm — Wenderoth, Lind & Ponack, L.L.P.

(57) ABSTRACT

Composition protective against fire and use comprising: Water: 25-42% by weight; Ultramarine Blue: 0.015-0.025% by weight; Preservative: 0.09-0.15% by weight; Vegetable Binder: 1.6-2.7% by weight; Spanish White: 6-10% by weight; Calcium Carbonate: 33-56% by weight; Sulphate of Lime: 9-15% by weight, having a dual function, acting as a protective substance against fire as well as a fire-combating substance, such that as protective substance against fire, through application or spraying thereof on a surface to be protected, should it be reached by fire, it acts as protective barrier preventing fire from destroying or damaging it, while as fire-combating substance, through application or spraying thereof on a surface in flames, the fire is quenched and extinguished. The composition is breathable and absolutely wholly ecological, and consequently does not affect plant varieties, permitting the creation of totally effective firebreak "barriers".

10 Claims, No Drawings

COMPOSITION PROTECTIVE AGAINST FIRE AND USE

This application is a continuation application of International Application No. PCT/ES2009/070245 filed Jun. 24, 2009.

OBJECT OF THE INVENTION

The following invention, as the title of the present specification states, relates to a composition protective against fire and use, with the advantage and main objective of having the dual function of acting as a protective substance against fire as well as a fire-combating substance.

Thus, as protective substance against fire, through application or spraying thereof on the surface to be protected, should it be reached by fire, it acts as a protective barrier preventing fire from acting thereon, whilst as fire-combating substance, through application or spraying thereof on a surface in flames, the fire is quenched.

Furthermore, using the composition in its function as a protective substance against fire enables its application and subsequent maintenance and preservation of its characteristics over long periods of time, being removed and losing its effectiveness with water, whereby in order to obtain a new protection it should be re-applied to the desired surface.

A second object of the composition is that it is breathable and absolutely wholly ecological, not affecting plants, whereby it can be applied in its function as a protective composition, mainly permitting the creation of totally effective firebreak "barriers", in case of fire.

Another object of the invention is that the incorporation of fluorescent or phosphorescent substances into the composition enables, in case being used in its protective function, locating the areas wherein the composition is still present and the areas wherein the composition is not present, so as to act accordingly.

FIELD OF APPLICATION

The present specification describes a composition protective against fire, being applied with a dual function by enabling its application as a protective substance against fire and as a fire-combating substance.

BACKGROUND OF THE INVENTION

As it is known, broadly speaking, there are three types of fires: those occurring in solids such as wood, paper, plastic, etc.; those caused by inflammable liquids, and those caused by electricity.

Depending on the type of fire the combating means vary, and thus water is the means used in fighting against fires of type A, i.e., fires occurring in solids, because of the effectiveness it has when cooling the material.

In fighting against fires of type. B, i.e., fires caused by liquids, a foam composed of a mixture of water, sodium bicarbonate and powdered aluminum sulphate is used. Likewise, retardant products are added to the water of said composition.

Thus, in all cases these are means for fighting the fire in order to combat same and not with a prior protective effect.

On the other hand, as it is well known forest fires are serious problems due to the loss of forest mass and the consequences that it entails, and for the possible loss of human lives that, unfortunately, often occurs.

Thus, fighting against forest fires creates different problems, so that given the virulence as they spread destroying everything in their path, and fire brigades can not approach them due to the high temperatures generated, whereby, in the first place other combating means such as the air ones should be used.

In this way, the flames are fought with air means by pouring amounts of water on the flames so as the brigades can approach the fire once it has been controlled.

On the other hand, air fight effectiveness is reduced since, as a result of high temperatures, the water evaporates and the arriving amount is minimal, and although the fire force is initially reduced by the oxygen loss, it is often reactivated.

Also, "firebreaks" are used when fighting forest fires in order to stop the advance thereof once reached, but in order for these "firebreaks" are effective the land must be completely clean of weeds, which unfortunately, is not common.

On the other hand, the patent documents ES 2123464; ES 2128315 and ES 2171187 can be considered, so that document ES 2123464 describes a composition suitable for producing a fire-fighting foam, foam and fire prevention system using said foam, composition of which comprises an anionic surfactant and a foam stabilizing agent.

Document ES 2128315 describes a composition for extinguishing fires, composition of which comprises, at least, one fluoro-substituted propane and a method for preventing fires based on establishing into a confined space an oxygen-containing atmosphere but which does not sustain the combustion, based on introducing into the confined space, at least, one fluoro-substituted propane.

Document ES 21717187 describes cement compositions containing plaster and materials made from the same, composition of which comprises between 30 and 75% by weight of calcium sulphate, between 10 and 40% by weight of Portland cement, between 4 and 20% by weight of fumed silica, and between 1 and 40% by weight of pozzolanic load.

DESCRIPTION OF THE INVENTION

In the present specification a composition protective against fire and use thereof is described, composition of which comprises:

| COMPONENT | AMOUNT |
| --- | --- |
| Water | 25-42% |
| Ultramarine Blue | 0.015-0.025% |
| Preservative | 0.09-0.15% |
| Vegetable Binder | 1.6-2.7% |
| Spanish White | 6-10% |
| Calcium Carbonate | 33-56% |
| Lime Sulphate | 9-15% | and more preferably, in an embodiment of the invention, the composition protective against fire has the following composition:

| COMPONENT | AMOUNT |
| --- | --- |
| Water | 33.6 |
| Ultramarine Blue | 0.02 |
| Preservative | 0.12 |
| Vegetable Binder | 2.15 |
| Spanish White | 8 |
| Calcium Carbonate | 44.11 |
| Lime Sulphate | 12 | said composition having a dual function, since it can be used as a protective substance against fire and as a fire-combating substance.

In using the composition as protective substance against fire, this will be applied or sprayed on the surface to be protected adhering thereto, creating a barrier and maintaining intact its characteristics for a long period of time, so that if the fire reaches said area, it acts as a protector preventing the protected surface from burning, acting as a firebreak protective barrier.

On the other hand, the composition applied as a protective substance is removed by using water, so that in case of rain, a new application for keeping the surface protected would be required if the protection of the area is to be maintained.

This use as protective substance provides a great advantage, since sufficient time allows it to be applied to the surface to be protected.

In using the composition as protective substance against fire, this will be applied to the fire being adhered to the material or plant, and subsequently when water is sprayed the protective substance is removed.

Another important advantage is that the composition is absolutely wholly ecological and breathable, consequently its application on plants does not affect them, and by spraying water it is completely removed, thus plants are not affected.

Furthermore, in order to be capable of determining, especially in those cases where the composition is used as a protective substance, the surface wherein it is present or not, or in order to suit same to the environment aesthetics to which it is applied, it may include coloring substances, which may be present in a percentage between 0.1 and 4%, the calcium carbonate of the composition being lowered in the same percentage. In a preferred embodiment of the invention, the coloring substances will be present in a percentage of 2% and, in said case, the percentage of calcium carbonate in the composition will be 42.11%.

Also, the composition object of the invention can include fluorescent or phosphorescent substances which make it possible to determine on what areas the composition as a protective substrate has been applied, still remains thereto.

Thus, for example, in case of rain over the surface wherein the composition has been applied as a protective substance, it may be determined in which areas the rain has washed off the composition or not, in order to be capable of re-applying the composition in areas of interest.

In this way, the composition object of the invention is particularly applicable in fighting and protecting forest fires, permitting the creation of protective barriers as well as the protection of certain areas, such as can be residential areas.

Example

A composition of 1,000 kg was prepared based on the following percentages:

| COMPONENT | AMOUNT |
| --- | --- |
| Water | 338 Kg |
| Ultramarine Blue | 0.2 Kg |
| Preservative | 1.3 Kg |
| Vegetable Binder | 21.5 Kg |
| Spanish White | 80 Kg |
| Calcium Carbonate | 439 Kg |
| Sulphate of Lime | 120 Kg | so that the preservative may be isothiazolones and the vegetable binder may be vegetable glue.

From this composition, 300 kg were partially applied as a protective substance, to a vegetal mass consisting of dry olive branches, leaving a side part without the application of the composition, and fire was ignited in the unprotected area, so that unprotected branches burnt with great rapidity and virulence and when reaching the protected area or surface the flames stopped their advance until extinguishing.

On the other hand, another 300 kg were applied as fire-combating substance, so that previously a vegetal mass consisting of dry olive branches had been prepared, wherein fired was ignited, so that the branches burnt with great rapidity and virulence, but when the composition was applied the fire was quenched.

Subsequently, both in one case and in the other, when water is poured on the remaining mass, the composition was washed off by the water, and the protected branches were visible again.

4 kg of green coloring substances were also added to 200 kg of the obtained initial composition, and these were applied to a wooded forest mass being perfectly integrated into the environment, remaining inalterable for thirty days, after which the composition was washed off, and the wooded forest mass remained in perfect condition.

To the remaining 200 kg of the obtained initial composition fluorescent substances were finally included, and these were applied to a wooded forest mass being able to observe the areas wherein it was applied, and how it stayed as days passed, until twenty-five days after it was washed off and removed by rain, the wooded forest mass remaining in perfect condition.

The invention claimed is:

1. A composition protective against fire, being useful in fighting different types of fires, comprising:

| Component | Amount |
| --- | --- |
| Water | 25-42% by weight |
| Ultramarine Blue | 0.015-0.025% by weight |
| Preservative | 0.09-0.15% by weight |
| Vegetable Binder | 1.6-2.7% by weight |
| Spanish White | 6-10%% by weight |
| Calcium Carbonate | 33-56% by weight |
| Sulphate of Lime | 9-15% by weight. |

2. The composition protective against fire, according to claim 1, comprising:

| Component | Amount |
| --- | --- |
| Water | 33.6% by weight |
| Ultramarine Blue | 0.02% by weight |
| Preservative | 0.12% by weight |
| Vegetable Binder | 2.15% by weight |
| Spanish White | 8% by weight |
| Calcium Carbonate | 44.11% by weight |
| Sulphate of Lime | 12% by weight. |

3. The composition protective against fire, according to claim 1, further comprising between 0.1 and 4% of additional coloring substances, the calcium carbonate being reduced by said percentage.

4. The composition protective against fire, according to claim 1, comprising substances selected from the group consisting of fluorescent and phosphorescent substances.

5. The composition protective against fire, according to claim 1, wherein the composition is breathable.

6. The composition protective against fire, according to claim 2, wherein the composition is breathable.

7. A method of using the composition described in claim 1 as a protective substance for all types of combustible materials comprising applying the composition to a surface in danger of being burnt.

8. A method of using the composition described in claim 1 as a protective substance for all types of plants comprising applying the composition to a plant surface in danger of being burnt.

9. A method of using the composition described in claim 1 as a fire-combating substance for all types of combustible materials and plants comprising applying the composition to the materials and plants in danger of being burnt.

10. A composition protective against fire, being useful in fighting different types of fires, comprising:

| Component | Amount |
|---|---|
| Water | 33.6% by weight |
| Ultramarine Blue | 0.02% by weight |
| Preservative | 0.12% by weight |
| Vegetable Binder | 2.15% by weight |
| Spanish White | 8% by weight |
| Calcium Carbonate | 42.11% by weight |
| Sulphate of Lime | 12% by weight |
| Additional coloring substances | 2% by weight. |

* * * * *